United States Patent [19]

Ross

[11] 4,317,485
[45] Mar. 2, 1982

[54] PUMP CATCHER APPARATUS

[75] Inventor: Richard J. Ross, Houston, Tex.

[73] Assignee: Baker International Corporation, Orange, Calif.

[21] Appl. No.: 153,102

[22] Filed: May 23, 1980

[51] Int. Cl.³ .......................................... E21B 33/129
[52] U.S. Cl. ........................................ 166/216; 285/2; 403/2; 294/86.18
[58] Field of Search ................ 166/206, 208, 213–217, 166/317, 123, 181, 105, 107; 175/301, 276, 294; 285/2; 403/2; 294/86.18

[56] References Cited

U.S. PATENT DOCUMENTS

| 2,671,640 | 3/1954 | Baker | 166/123 X |
| 2,931,438 | 4/1960 | Thompson | 166/216 X |
| 3,282,340 | 11/1966 | Park | 166/106 |
| 3,327,784 | 6/1967 | Pardue | 294/86.18 X |
| 3,960,399 | 6/1976 | Dufrene | 294/86.18 X |

Primary Examiner—Ernest R. Purser
Attorney, Agent, or Firm—William C. Norvell, Jr.

[57] ABSTRACT

A pump catcher apparatus is provided for supporting within a subterranean well a portion of a tubular conduit and a pump depending from the conduit. The apparatus comprises a control mandrel and a main body extending from the control body. Slip elements are provided on the main body for anchoring the pump catcher to the well conduit and are selectively shiftable to anchoring engagement with the casing by axial manipulation of the tubular conduit. A telescoping connection is provided between the control mandrel and the tubular conduit so that limited longitudinal movement of the tubular conduit will be permitted without disturbing the anchored engagement of the slip elements. Shearable members are provided between the control mandrel and the main body for selectively securing the main body to the mandrel and are severable by a predetermined force. Shock absorbing springs protect the severable elements from impact forces less than the predetermined force required to separate the control mandrel and the main body in the event that the slip elements fail to release.

8 Claims, 8 Drawing Figures

PUMP CATCHER APPARATUS

BACKGROUND OF THE INVENTION

1. Field of the Invention

The invention relates to a device for catching a subterranean well pump and a portion of the tubing string carrying said pump.

2. Description of the Prior Art

During production of subterranean wells, a submersible electric pump is sometimes attached to the bottom of a production tubing string within the well casing, or other conduit, at depths typically of several thousand feet. Despite precautions, the tubing string carrying the pump may eventually break, due to corrosion, an accident during a retrieval operation, or the like. In such a case, the pump, the lower portion of the tubing string, broken electric cables, and bands which normally retain the cables, may drop to the bottom of the well. The resultant buckling of the tubing, and tangle of cables and bands makes a fishing retrieval operation extremely difficult. Additionally, a drop of any significant distance may, of course, damage or destroy the pump.

To limit the fall distance of a pump in such an accident, it has previously been attempted to first anchor a separate drillable cement retainer or drillable packer to the well casing, below the depth to which the pump would then be run. While a retainer or packer tool so anchored may be able to stop the fall of a pump, such a makeshift arrangement has required an additional setting operation.

Because setting of a device to catch the pump by means of tubular rotation is an unacceptable method for most operators, due to interference with electric cable running down the exterior of the tubing, a pump catcher must also be reliably set and released only by controlled longitudinal movement of the tubing string.

SUMMARY OF THE INVENTION

A pump catcher embodying the invention comprises an anchor slip assembly, a control mandrel, a main body and may also comprise a telescoping expansion joint. The anchor assembly is anchored against the interior wall of the well casing a short distance below the pump. In this position, the apparatus will limit the fall of the pump in the event that the production tubing string supporting the pump breaks. The telescoping expansion joint extending between the pump and the anchor catcher below is able to compensate for tubular expansion and contraction.

The anchor slip assembly is attached to the bottom of the control mandrel by means of a main body which passes axially through the anchor slip assembly. Longitudinal movement of the tubing string, and thus of the main body, sets the anchor slip assembly. The anchor unit has a plurality of circumferentially spaced rocker slips, adapted to engage the inside wall of the well casing. The rocker slips are pivotable from a position in which lower friction shoe surfaces contact the well, to provide drag on the tool during run-in to a second or set position, in which upper serrated surfaces grip the casing wall. The pivotable slips are spring-biased to the position in which the friction shoes contact the casing wall. When the pump catcher is to be set in the well, the slips are anchored by longitudinal movement of the main body mandrel which urges the slips into gripping engagement with the casing wall.

When the main body extends axially through the center of the anchor assembly, an inwardly projecting J-pin on the anchor assembly engages a control slot formed in the outer cylindrical surface of the main body. This engagement of slot and J-pin limits the relative axial movement of the main body and the anchor unit. The configuration of the slot is such that longitudinal movement of the main body will guide the pin to different positions necessary for the various procedures in the operation of the pump catcher. Although the main body is rotated by the motion of the J-pin through the slot, the expansion joint isolates this rotation from the production tubing string thereabove.

When the apparatus is run into the well, the friction shoes contact the casing wall to support the weight of the tool and engagement of the slot and J-pin prevents a cone on the main body from urging the rocker slips into gripping engagement with the casing wall.

When the apparatus is run to the desired location, longitudinal movement of the tubing string, and thus of the main body shifts the pin into a position in the control slot that will permit the main body to move downwardly a sufficient distance to set the tool by urging the rocker slips into gripping engagement with the casing. Once the pump catcher is set, the tubing string is pulled up again to space out the expansion joint to the required distance. Production from the well may then begin.

When the tool is to be retrieved, longitudinal movement of the tubing string will shift the J-pin into a position in which the main body can pull upwardly on the anchor unit. This upward movement should release the rocker slips, allowing the tool to be retrieved. In the event that the tool cone is stuck and cannot be unset, a shearable connection between the control mandrel and the main body permits retrieval of the pump and the control mandrel, together with the expansion joint, if the pump catcher is provided with such a joint. The shearable connection comprises at least one radial shear pin, and an axial, breakable tensile element. As the tool is being run into the well, it may receive many relatively light jolts or impacts. Although the force transmitted to the shearable connection will be less than the required complete shear force, such impact may affect the final integrity of the shear pin. To protect the shear pin and tensile element from premature breakage, shock absorption means are provided to absorb these light impacts. A first biasing means such as a helical compression spring within the telescoping expansion joint and a second biasing means, such as a second helical compression spring around the tensile element absorb these impact forces during running in of the tool.

DESCRIPTION OF THE PREFERRED EMBODIMENTS

Figure 1:
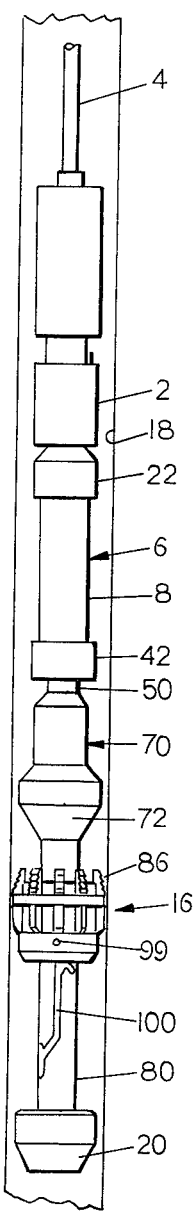
FIG. 1 is a schematic view showing the pump catcher being run into a well.
Figure 2:
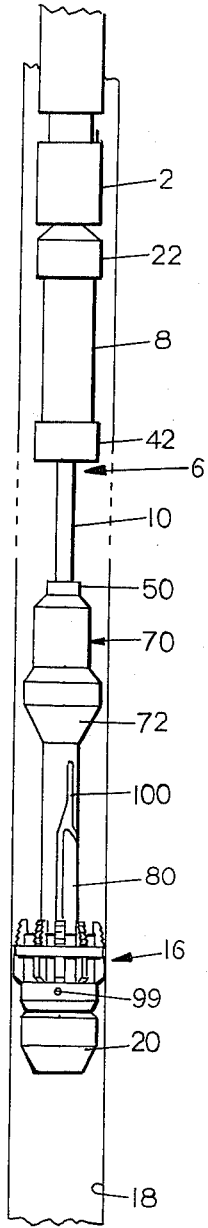
FIG. 2 is a schematic view showing the pump catcher being pulled up to the desired location for setting.
Figure 3:
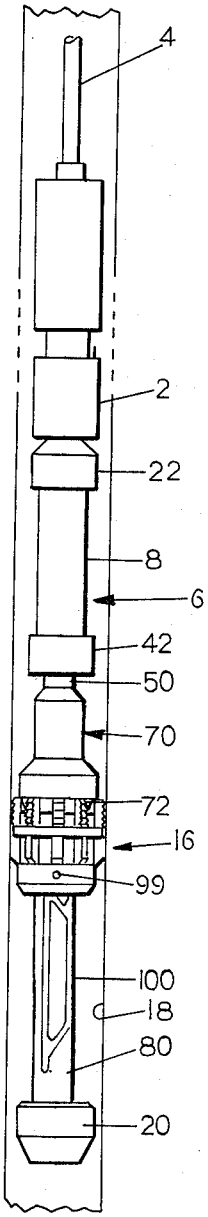
FIG. 3 is a schematic view illustrating the pump catcher being set against the interior wall of the casing.
Figure 4:
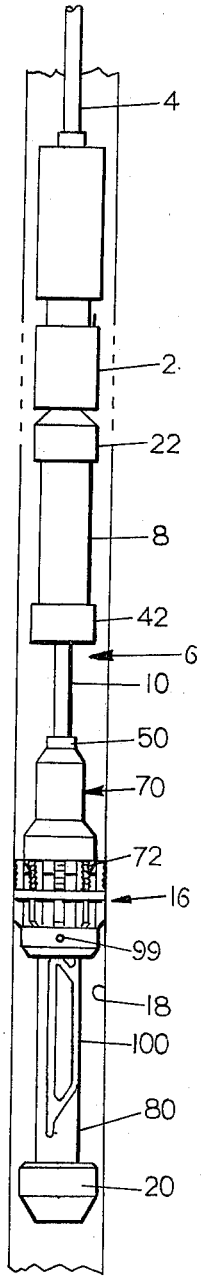
FIG. 4 is a schematic view showing the production string being picked up above the anchored pump catcher, to space out the expansion joint.

As illustrated generally in FIGS. 1 through 4, the pump catcher embodying the present invention is used in conjunction with an electric rotary pump 2 which is attached to the bottom of a production string 4. The upper portion of the pump catcher preferably comprises an expansion joint 6 having an outer housing 8 and a control mandrel 10. The expansion joint 6 connects the pump 2 to an operating cone 70 attached to the top of a main body member 80. The main body member 80 extends through the axial bore of an anchor slip mechanism 16. By longitudinal movement of the main body member 80 through the anchor mechanism 16, the anchor mechanism 16 may be shifted from a position of sliding engagement with the well casing 18, as illustrated in FIGS. 1 and 2, to a position of firm, anchored engagement with the well casing 18, as illustrated in FIGS. 3 and 4. The main body member 80 terminates at its lower end in a guide plug 20.

Figure 5:
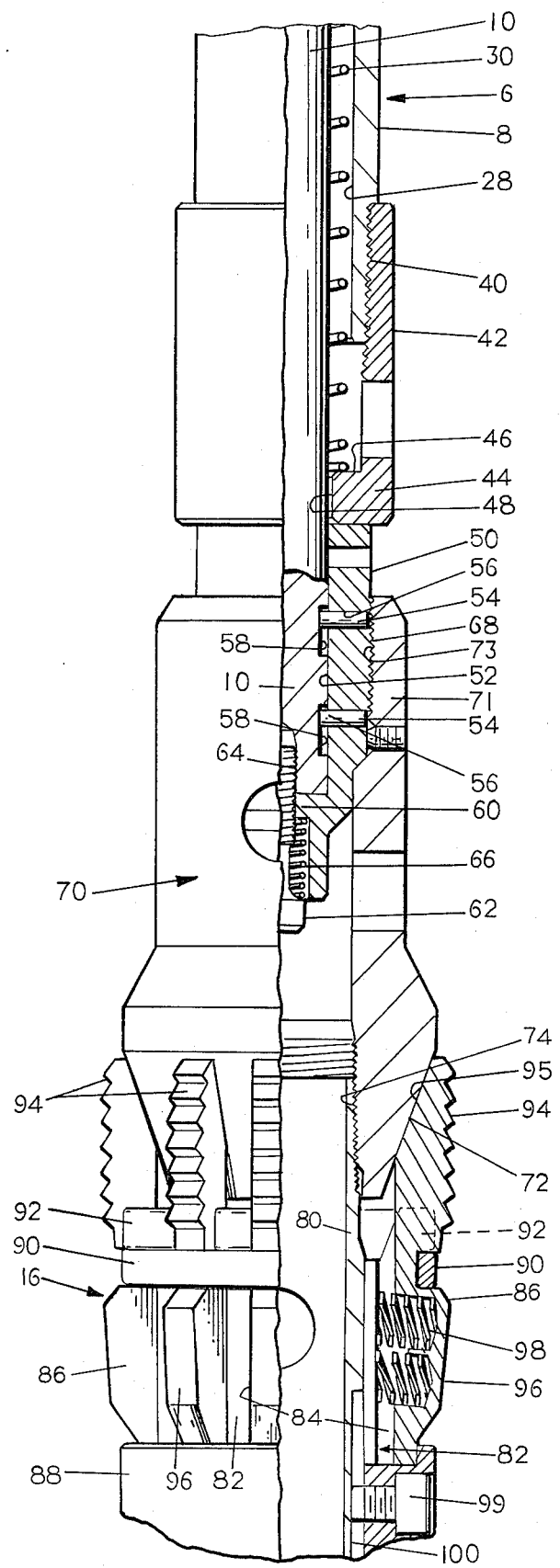
FIG. 5 is an elevational view, partially in section, illustrating the anchor slip and cone assembly, and the lower portion of the expansion joint.
Figure 6:
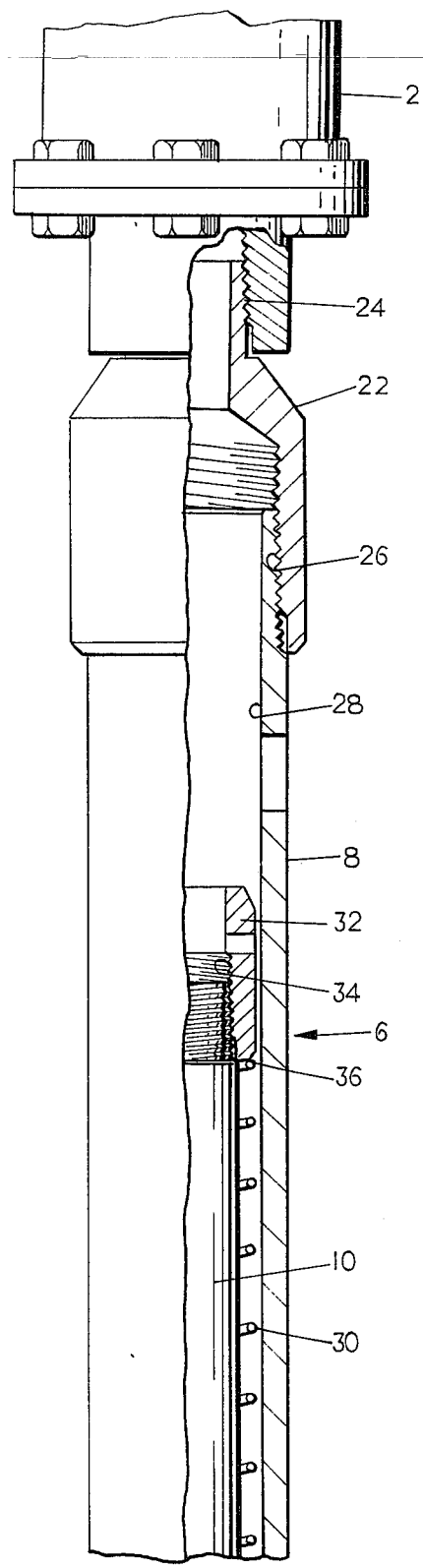
FIG. 6 is an elevational view, partially in section, illustrating the upper portion of the expansion joint, attached to the lower end of an electric rotary pump.

Referring now to FIGS. 5 and 6, a cross-over sub 22 is connected by an upper threaded portion 24 to the bottom of the pump 2. From the upper threaded portion 24, the cross-over sub 22 tapers outwardly and downwardly to define a large diameter lower section connected by internal threads 26 to the top of the expansion joint outer housing 8. Within the bore of the outer housing 8 of the expansion joint 6, is the coaxial control mandrel 10. A helical compression spring 30 surrounds the control mandrel 10, within the annulus defined by the bore 28 of the outer housing 8 and the outer surface of the control mandrel 10. A stop nut 32 is secured to the top of the control mandrel 10 by means of internal threads 34. As the outside diameter of the stop nut 32 is only slightly less than the bore 28 of the housing 8, the control mandrel 10 is maintained in coaxial alignment within the housing 8 throughout the stroke of the expansion joint 6. The stop nut 32 has a downwardly facing shoulder 36 which retains the upper end of the compression spring 30.

The lower portion of the expansion joint 6 is illustrated in FIG. 5. The lower end of the tubular housing 8 is connected by external threads 40 to an internally threaded stop cap 42. The stop cap 42 has an inwardly projecting, annular flange 44 which underlies the bottom end of the tubular housing 8. This lower, annular flange 44 of the stop cap 42 has an upwardly facing shoulder 46, which acts as a stop for the lower end of the compression spring 30. When the expansion joint 6 is in its extreme extended position, as shown schematically in FIG. 2, the spring 30 is compressed between the upwardly facing shoulder 46 and the shoulder 36 of the stop nut 32. Therefore, the stop cap 42 and the stop nut 32 limit the extent of the stroke of the expansion joint 6. The reduced diameter bore 48 of the stop cap 42 is only slightly greater than the outside diameter of the control mandrel 10, thereby assuring the coaxial alignment of the control mandrel 10 and the outer housing 8 of the telescoping expansion joint 6.

The lower end of the control mandrel 10 extends below the tubular housing 8 and through the bore 48 of the stop cap 42. The extreme end of the control mandrel 10 fits within the bore 52 of an annular shear pin retainer 50. A plurality of shear pins 54 extend through radial holes 56 in the shear pin retainer 50 into circumferential grooves 58 formed in the lower portion of the control mandrel 10. Because the grooves 58 have a greater axial width than the diameter of the shear pins 54, some limited relative axial movement of the mandrel 10 and the shear pin retainer 50 is possible without placing any shearing force on the pins 54.

The shear pin holder 50 has a lower inwardly projecting annular flange 60 which underlies the bottom of the control mandrel 10. The control mandrel 10 and shear pin retainer are further attached by means of an axial tensile bolt 62 extending through the lower flange 60 of the shear pin retainer 50 and threadably attached to the internally threaded bore 64 of the control mandrel 10. The tensile bolt 62 is not, however, threaded in the flange 60 of the shear pin retainer 50 nor does the head of the bolt 62 contact the flange 60. Therefore, some limited upward movement of the control mandrel 10 relative to the shear pin retainer 50 is possible before the bolt 62 interferes with such movement. A helical compression spring 66 surrounding the tensile bolt 62 resists and partially cushions forces tending to cause such axial movement.

The shear pin retainer 50 is attached to the slip-operating cone 70. The cone 70 has an upper cylindrical portion 71 connected by internal threads 73 to external threads 68 on the shear pin retainer 50. The threaded portion 71 overlies the ends of the shear pins 54, thereby preventing them from sliding radially out of the holes 56. The lower portion of the cone 70 defines a conical surface 72 which tapers downwardly and inwardly. The cone 70 has internal threads 74 connected to the main body member 80.

The main body member 80 extends axially through the bore of the anchor slip assembly 16. A J-pin 99 extends radially inwardly from slip assemby 16 to engage a control slot 100 formed in the outer cylindrical surface of the main body member 80.

The slip assembly 16 comprises a slotted ring 82 having a plurality of axial slots 84, each retaining a rocker slip 86. The slips 86 are retained against downward movement by a slip stop ring 88, which is secured to the bottom of the slotted ring 82 by a plurality of peripherally spaced, axially extending bolts. The rocker slips 86 are retained against outward movement by an annular retention ring 90 surrounding the slotted ring 82 and rocker slips 86. An outwardly extending flange 92 at the top of the slotted ring 82 retains the retention ring 90 and thus the rocker slips 86 against upward displacement.

Each rocker slip has an upper, outwardly facing, serrated slips 94, and a lower, outwardly facing, friction shoe 96. The upper inside surface of each rocker slip, behind the slips 94, comprises a downwardly and inwardly tapered camming surface 95. The retention ring 90 provides a fulcrum for pivoting the rocker slips from a position in which the serrated slips 94 grip the interior wall of the casing 18, to a position in which the friction shoes 96 slidably engage the inside of the casing 18. Springs 98 normally bias the rocker slips 86 to the second position. As will be described, the cone 70, main body member 80 and slip assembly 16 together constitute the main body and provide means for anchoring the pump catcher to the well casing 18.

OPERATION

To set the pump catcher, the threads 24 of the heavy duty cross-over sub 22 are first threaded onto the bottom of a conventional rotary electric pump 2. With the pump 2 and pump catcher supported from above, the expansion joint 6 will be stretched out. The anchor slip assembly 16 must be manipulated so that the J-pin 99 is in the start position 101 of the control slot 100. As the pump catcher enters the well, the friction shoes 96 engage the wall 18 with sufficient force to support the weight of the anchor slip mechanism 16. As of the tool is lowered, the expansion joint 6 collapses, and the main body member 80 moves downward until the J-pin 99 is against the "running position" end 102 of the control slot 100. With the tool in this configuration, illustrated in FIG. 1, the pump catcher is moved downward into the well against the drag provided by the friction shoes 96.

After the pump catcher is run-in somewhat below the desired anchoring location, the tubing string 4 is picked up. The upward motion of the tubing string 4 stretches out the expansion joint 6, then pulls the main body member 80 upwardly. Being supported by the friction shoes 96, the anchor slip assembly 16 remains stationary until upward movement of the main body member 80 shifts the J-pin 99 into the lower safety-retrieval position 103 of the control slot 100. Continued upward motion of the tubing string lifts the anchor slip assembly 16 upward, by engagement of the J-pin 99 and slot 100, until the slip mechanism 16 is in the desired anchor position in the casing 18, as shown in FIG. 2.

Subsequent downward movement of the tubing string 4 will shift the J-pin 99 into the set position 104 in the control slot 100. Because of the relatively long upward extension of the set slot 104, the J-pin 99 does not reach the end of the slot position 104, thereby limiting relative axial movement of the main body member 80 and the slip assembly 16. Instead, the cone 70 first comes in contact with the rocker slips 86. The tapered conical surface 72 of the cone 70 engages the tapered camming services 95 adjacent the serrated slips 94, and cams the slips 94 into firm anchored engagement with the casing, as illustrated in FIG. 3.

Once the rocker slips 86 are set, the tubing string 4 is again lifted to space out the expansion joint 6 a predetermined distance that will allow for expansion of the tubing string without disturbing the setting of the anchor slip assembly 16, as shown in FIG. 4. Setting of the pump catcher now is completed.

Some wells have a casing inside diameter larger than that which the pump catcher is designed to set in, and a smaller inside diameter liner is carried therebelow. Ultimately, the pump catcher must pass through the larger casing and into the smaller diameter liner for anchoring within the liner. In such a well, the slips 86 would not continuously contact the large inside diameter wall to support the weight of the pump catcher as the tool is run-in. Therefore, the tool would not remain continuously centered within the casing as it was run-in, so the slips 86 would randomly contact the wall from time to time. The drag thus produced could be sufficient to change the position of the J-pin 99 in the control slot 100. Therefore, when the pump catcher reaches the shoulder tapering to the smaller inside diameter of the liner, the J-pin 99 and rocker slips 86 could be in their set position. To run the tool into the liner, it would first be necessary to raise the tool to release the rocker slips, then return the J-pin 99 to the run position 102 of the control slot 100. However, raising the slip assembly 16 could be accomplished only with the J-pin 99 in the safety-retrieval position 103, from which the J-pin 99 would normally be shifted to the set position 104. Returning the J-pin 99 to the run position 102 would be an extremely exacting, if not impossible, procedure utilizing the standard control slot 100. To solve this difficulty, an alternative control slot configuration 110 may be substituted when the pump catcher is to be used in conjunction with a casing liner.

Figure 8:
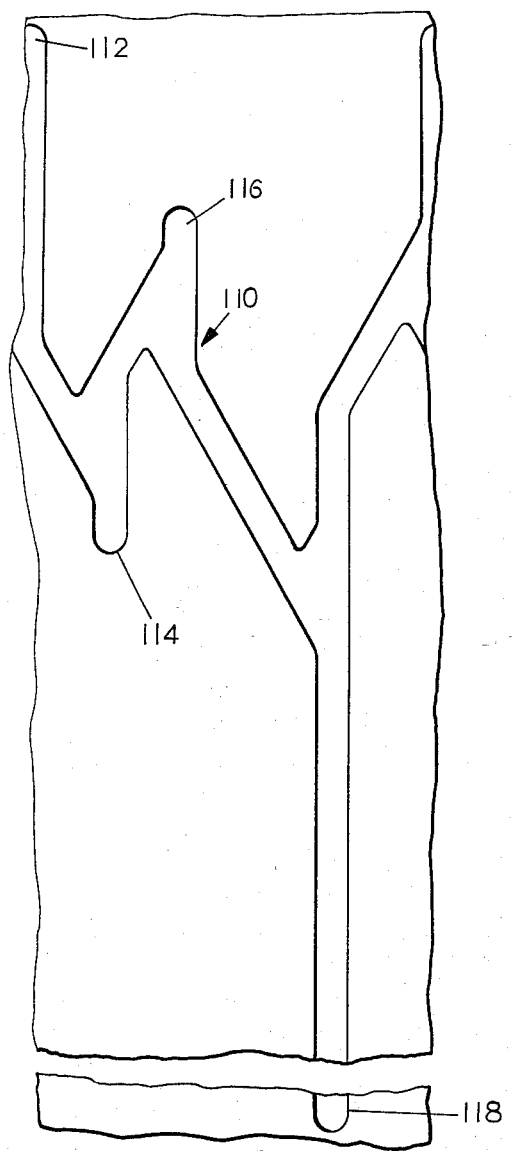
FIG. 8 is a view of an alternative control slot which extends 360° around the main body.

The control slot 110 illustrated in FIG. 8 extends completely around the cylindrical surface of the control mandrel. By successive axial movement of the control mandrel, the J-pin 99 can be shifted from a set position 112 to a start position 114, to a run position 116, to a safety-retrieval position 118, and thence back to the set position 112. If, as described above, a pump catcher tool with the alternate control slot 110 is caught at the top of the liner in the set position, upward movement of the control mandrel will shift the J-pin to the start position 114 and lift the slip assembly 16. Downward movement of the control mandrel will then shift the J-pin 99 to the run position 116, allowing the mandrel to push the slip assembly 16 into the liner. The setting procedure could then continue as described above.

After the tool is set, if the tubing string 4 above the pump 2 eventually breaks, the fall of the pump 2 will collapse the expansion joint 6, and then be arrested by the anchored slip assembly 16.

To retrieve the pump catcher tool, a conventional fishing tool is secured to the pump 2 or a section of broken tubing still attached above the pump 2. Upward movement of the broken tubing section will stretch out the expansion joint 6, and lift the cone 70 and control mandrel 80 until the J-pin 99 is shifted into the start position 114 in the control slot 100. An upward pull on the tubing string will normally release the slips 94 from engagement with the casing 18. The springs 98 will return the rocker slips to the position in which friction shoes 96 slidably engage the casing 18. Lowering the tubing string a short distance will shift the J-pin to the running position 116. Upward movement of the tubing string will then shift the J-pin into the safety-retrieval position 118. The pump 2 and the entire pump catcher tool may then be lifted to the surface.

In the event that the cone 70 is jammed in the slip assembly 16, a sufficient upward pull on the pump 2 will cause the shear pins 54 and the tensile bolt 62 to break, thereby permitting retrieval of the pump 2 and the expansion joint 6.

Figure 7:
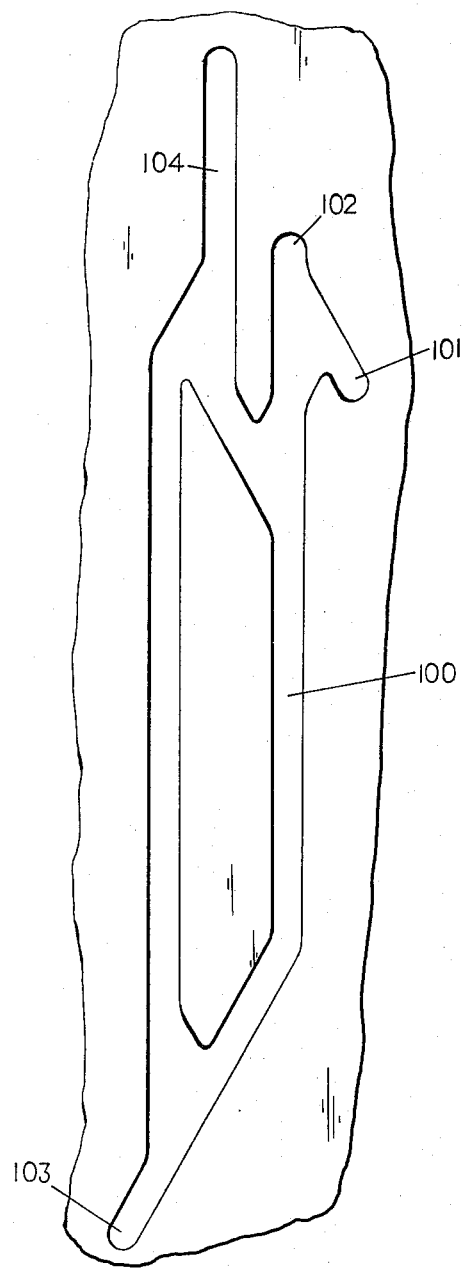
FIG. 7 is an enlarged scale view, showing in detail the configuration of the control slot formed in the control mandrel.

The safety-retrieval position 103 of the control slot 100 provides an additional safety feature during retrieval. As illustrated in FIG. 7, downward movement of the control slot 100 relative to the J-pin 99 in the safety-retrieval position 103 will guide the J-pin 99 to the set position 104. If during retrieval the string 4 supporting the pump 2 and pump catcher tool breaks or is dropped, the friction shoes 96 of the rocker slips 86 will continue to support the weight of the anchor slip assembly 16. As the rest of the tool begins to fall, the main body member 80 moves downwardly past the J-pin 99. By virtue of the configuration of the control slot 100, the J-pin 99 is guided into the set position 104. Thus, as the main body mandrel 80 continues to move downwardly, the camming surface 72 of the cone 70 will contact the camming surfaces 95 of the rocker slips 86, thereby forcing the slips 94 into anchored engagement with the casing 18. In this manner, the pump catcher automatically anchors in the casing 18, to arrest the fall of the pump 2 and tubing string 4.

Similarly, the alternate control slot 110 for use in oversize casings with liners leads directly from the safety-retrieval position 118 to the set position 112. However, the tool will not automatically set unless it is in a reduced inside diameter portion of the casing which the friction shoes 96 can engage. Typically, therefore, the safety-retrieval position 118 of a tool having the alternative slot configuration 110 will be significant only while the tool is in the reduced inside diameter lining.

As the tool is being run into the well, it may receive relatively light impacts caused by the weight of the tool and by tubing movement. When the expansion joint 6 is stretched out, such impacts will be transmitted through the shear pins 54. Although these relatively light impacts will not transmit sufficient force to immediately shear the pins 54, a series of such impacts could eventually adversely affect the shear strength of the pins 54, causing premature shearing. In such an event, the cone 70 and main body member 80 will no longer be attached to the expansion joint 6, and it will be impossible to set or retrieve the tool as described. To protect the shear pins 54, the compression springs 30 and 66, and the tensile bolt 62 are provided to absorb impact forces. The compression spring 30 cushions the jolt that will otherwise occur when the stop nut 32 and the stop cap 42 come into contact as the expansion joint 16 reaches its maximum extension.

The compression spring 66 also absorbs shock caused by upward movement of the control mandrel 10 relative to the shear pin retainer 50. The width of the circumferential grooves 58 permits some compression of the spring 62 before any shearing force is transmitted to the shear pins 54.

The tensile bolt 62 also provides some shock absorbing capability. The bolt 62 will absorb higher tensile forces without damage than the shear forces which the shear pins 54 can absorb without damage. The bolt 62 is preferably formed of any one of a number of well known materials which will elongate a relatively large amount before breaking. Therefore, the bolt 62 has a limited capacity to absorb a number of relatively heavy impacts which will elongate the bolt 62. Preferably, the bolt 62 will elongate and not break completely until after the shear pins 54 have sheared.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A pump catcher apparatus for supporting within a subterranean well conduit a portion of a tubular conduit and a pump depending from the tubular conduit, comprising: a control mandrel; telescoping means including said control mandrel connectable to said tubular conduit; a main body axially extending from said control mandrel; means on said main body for anchoring said pump catcher to the wall of the well conduit, said anchoring means being selectively shiftable to anchoring engagement with the well conduit wall by axial manipulation of the tubular conduit; severable means between said control mandrel and said main body permitting only limited axial relative displacement of said mandrel and said main body, said severable means being severable upon the occurrence of a predetermined axial force between said mandrel and said main body; and shock absorbing means for protecting said severable means from axial impact forces less than said predetermined axial force.

2. The apparatus of claim 1 wherein said shock absorbing means comprises first biasing means within said telescoping means, and second biasing means carried by said control mandrel, said first and second biasing means being moved to biased position upon telescopic expansion of said telescoping means.

3. The apparatus of claim 1 wherein said severable means comprises at least one radial shear pin attachable to one of said main body and said control mandrel and cooperating with an annular slot provided in the other of said main body and said control mandrel, said pin being shearable by a predetermined force, said annular groove having an axial width greater than the diameter of said shear pin, whereby a finite relative axial movement between said control mandrel and said main body places no shear force on said shear pin.

4. The apparatus of claim 1 wherein said shock absorbing means comprises biasing means within said telescoping means, said biasing means being moved to biased position upon telescopic expansion of said telescoping means.

5. The apparatus of claim 4 wherein said shock absorbing means further comprises at least one axial tensile element carried on one of said main body and said control mandrel, said tensile element being elongated by a predetermined tensile force.

6. The apparatus of claim 5 wherein said tensile element permits a limited axial movement between said control mandrel and said main body before restraining said movement, and a second biasing means carried by said tensile element resists said axial movement.

7. The apparatus of claim 5 wherein said tensile element elongates without breaking in response to a force less than said predetermined tensile force.

8. The apparatus of claim 1 further comprising means for anchoring said apparatus within a reduced internal diameter liner portion of a larger internal diameter conduit, and control slot and pin means for: (1) selectively moving said anchoring means into the liner portion; (2) shifting said anchoring means to anchored position within the liner; (3) releasing said anchoring means from anchored position; and (4) removing said apparatus from within the liner portion.

* * * * *